US008005061B2

(12) United States Patent
Abdel-Kader et al.

(10) Patent No.: US 8,005,061 B2
(45) Date of Patent: Aug. 23, 2011

(54) SYSTEM AND METHOD OF MAINTAINING A CONNECTION WITH A FIRST NETWORK WHILE PROCESSING COMMUNICATIONS WITH A SECOND NETWORK BY A COMMUNICATION DEVICE

(75) Inventors: Sherif Abdel-Kader, Waterloo (CA); Michael Peter Montemurro, Toronto (CA)

(73) Assignee: Research in Motion Limited, Waterloo, Ontario (CA)

( * ) Notice: Subject to any disclaimer, the term of this patent is extended or adjusted under 35 U.S.C. 154(b) by 936 days.

(21) Appl. No.: 11/769,830

(22) Filed: Jun. 28, 2007

(65) Prior Publication Data

US 2009/0003278 A1    Jan. 1, 2009

(51) Int. Cl.
*H04J 3/00* (2006.01)
(52) U.S. Cl. .......................................... 370/345
(58) Field of Classification Search .................. None
See application file for complete search history.

(56) References Cited

U.S. PATENT DOCUMENTS

| | | | |
|---|---|---|---|
| 7,039,358 B1 | 5/2006 | Shellhammer et al. | |
| 7,567,540 B2* | 7/2009 | Sakoda | 370/338 |
| 7,643,463 B1* | 1/2010 | Linsky et al. | 370/344 |
| 7,697,896 B2* | 4/2010 | Maekawa et al. | 455/63.1 |
| 7,751,840 B2* | 7/2010 | Sugaya | 455/517 |
| 7,856,000 B2* | 12/2010 | Ross | 370/338 |
| 2002/0059434 A1* | 5/2002 | Karaoguz et al. | 709/228 |
| 2004/0153676 A1* | 8/2004 | Krantz et al. | 713/300 |
| 2004/0242159 A1 | 12/2004 | Calderon et al. | |
| 2005/0266868 A1* | 12/2005 | Fuccello | 455/515 |
| 2006/0030265 A1* | 2/2006 | Desai et al. | 455/41.2 |
| 2006/0030266 A1* | 2/2006 | Desai et al. | 455/41.2 |
| 2006/0084383 A1* | 4/2006 | Ibrahim et al. | 455/41.2 |
| 2006/0089964 A1* | 4/2006 | Pandey et al. | 709/203 |
| 2006/0140215 A1* | 6/2006 | Fleming | 370/468 |
| 2006/0142004 A1* | 6/2006 | He et al. | 455/434 |
| 2006/0203850 A1* | 9/2006 | Johnson et al. | 370/503 |
| 2006/0270347 A1 | 11/2006 | Ibrahim et al. | |
| 2006/0274704 A1* | 12/2006 | Desai et al. | 370/338 |
| 2006/0292986 A1 | 12/2006 | Bitran et al. | |
| 2007/0049196 A1 | 3/2007 | Hillyard et al. | |
| 2007/0060055 A1* | 3/2007 | Desai et al. | 455/41.2 |
| 2007/0223430 A1* | 9/2007 | Desai et al. | 370/338 |
| 2007/0224936 A1* | 9/2007 | Desai | 455/41.2 |
| 2007/0238483 A1* | 10/2007 | Boireau et al. | 455/553.1 |

(Continued)

FOREIGN PATENT DOCUMENTS

EP          1 729 463 A1    12/2006

(Continued)

*Primary Examiner* — Ayaz R Sheikh
*Assistant Examiner* — Timothy J Weidner
(74) *Attorney, Agent, or Firm* — McCarthy Tétrault LLP (57) ABSTRACT

The invention conducts a first activity to maintain or establish the first connection in a series of spaced, timed segments, such that the segments represent a timeframe of an original activity that would span a continuous period that would cause a transmission conflict with the second connection; and conducts a second activity for the second network only between two of consecutive segments of the series of segments. The first network may be a 802.11-class network; the first activity may be a beacon scan for a channel of the 802.11-class network; the second network may be a Bluetooth network; and the second activity may be transmission of an Advanced Audio Distribution Profile data to a second device through the Bluetooth network.

14 Claims, 5 Drawing Sheets

U.S. PATENT DOCUMENTS

| | | | |
|---|---|---|---|
| 2007/0275746 A1* | 11/2007 | Bitran | 455/509 |
| 2008/0043685 A1* | 2/2008 | Sandblom | 370/338 |
| 2008/0043705 A1* | 2/2008 | Desai et al. | 370/346 |
| 2008/0101274 A1* | 5/2008 | Gilmore et al. | 370/315 |
| 2008/0123610 A1* | 5/2008 | Desai et al. | 370/339 |
| 2008/0259895 A1* | 10/2008 | Habetha et al. | 370/345 |
| 2009/0176454 A1* | 7/2009 | Chen et al. | 455/63.1 |
| 2010/0142504 A1* | 6/2010 | Bitran et al. | 370/338 |
| 2010/0309893 A1* | 12/2010 | Zhu et al. | 370/338 |
| 2010/0322222 A1* | 12/2010 | Desai | 370/338 |
| 2011/0002291 A1* | 1/2011 | Gonikberg et al. | 370/329 |

FOREIGN PATENT DOCUMENTS

| | | |
|---|---|---|
| WO | WO 2006/115990 A1 | 11/2006 |
| WO | WO 2007/002810 A2 | 1/2007 |

* cited by examiner

SYSTEM AND METHOD OF MAINTAINING A CONNECTION WITH A FIRST NETWORK WHILE PROCESSING COMMUNICATIONS WITH A SECOND NETWORK BY A COMMUNICATION DEVICE

The invention described herein relates to a system and method of communicating with a first and second network by a communication device. In particular, one network may be a Bluetooth (trade-mark) network and the other network may be a Wireless-Fidelity (Wi-Fi) network.

BACKGROUND

Wireless handheld mobile communication devices perform a variety of functions to enable mobile users to stay organized and in contact with others in a communication network through e-mail, schedulers and address books.

Prior art wireless communication devices can "simultaneously" be in contact with two or more networks. However, to reduce part counts, some components in these devices are used to provide communications with multiple networks, such as communication subsystems. When a prior art device is in contact with two communication networks, it needs to be able to maintain connections and transfer rates for both networks. Some networks and data transmissions have specific quality thresholds that need to be maintained. Prior art devices do not adequately adhere to such thresholds when accessing the "other" network.

There is a need for a system and method which addresses deficiencies in the prior art.

BRIEF DESCRIPTION OF THE DRAWINGS

Embodiments of the invention will now be described, by way of example only, with reference to the accompanying drawings, in which.

DETAILED DESCRIPTION OF AN EMBODIMENT

The description which follows and the embodiments described therein are provided by way of illustration of an example or examples of particular embodiments of the principles of the present disclosure. These examples are provided for the purposes of explanation and not limitation of those principles and of the invention. In the description which follows, like parts are marked throughout the specification and the drawings with the same respective reference numerals.

In a first aspect, a method of communicating with a first network and a second network by a communication device is provided. The method comprises: conducting a first activity to maintain or establish a first connection with the first network through a series of spaced, timed segments, such that the series of segments represent a timeframe of an original activity that would span a continuous period that would cause a transmission conflict with a second connection of the second network; and conducting a second activity relating to the second network only between two of consecutive segments of the series of segments.

In the method, the first network may be a 802.11-class network; the first activity may be a beacon scan in a channel of the 802.11-class network; the second network may be a Bluetooth network; and the second activity may be to transmit an Advanced Audio Distribution Profile (A2DP) data to a second device through the Bluetooth network.

In the method, the first activity may further comprise a passive beacon scan; the series of segments may comprise at least five segments, with each segment of the series being less than 23 ms in length (for example each segment being 21 ms); each segment may be scanned for a beacon signal in at least five successive beacon periods; and the original activity may be a continuous passive beacon spanning one notional beacon period for the first network.

In the method, the first activity may further comprise a passive beacon scan; the series of segments may comprise five segments; and each segment may be scanned for a beacon signal in five successive beacon periods.

In the method, consecutive segments of the series may overlap with each other when mapped to the notional beacon period.

In the method, the scan may be repeated for another channel associated with the network.

The method may be repeated periodically if no appropriate beacon signal is received.

The scan may be terminated when a connection carrying the A2DP data is terminated. The scan may be replaced with an earlier scheme when the connection is terminated.

The method may further comprise measuring transmission characteristics of the beacon signal after the beacon signal is received and may analyze the transmission characteristics to attempt to determine a source channel for the beacon signal.

In a second aspect, a communication device for communicating with first and second networks is provided. The device comprises: a communication subsystem providing transmission and reception of signals with the networks; a microprocessor; a timer; and a first and a second module. The first module controls aspects of a first connection with the first network utilizing the communication subsystem. The first module conducts a first activity to maintain or establish the first connection in a series of spaced, timed segments, such that the series of segments represent a timeframe of an original activity that would span a continuous period that would cause a transmission conflict with the second network. The second module controls aspects of a second connection with the second network utilizing the communication subsystem. The second module conducts a second activity relating to the second network only between two of consecutive segments of the series.

For the device, the first network may be an 802.11-class network; the first activity may be a beacon scan in a channel of the 802.11-class network; the second network may be a Bluetooth network; and the second activity may be to transmit A2DP data to a second device through the Bluetooth network.

For the device, the first activity may further comprise a passive beacon scan; the series of segments may comprise at least five segments, with each segment of the series being less than 23 ms in length (for example each segment being 21 ms);

in the first module, each segment may be scanned for a beacon signal in at least five successive beacon periods; and the original activity may be a continuous passive beacon spanning one notional beacon period for the first network.

For the device, the first activity may further comprise a passive beacon scan; the series of segments may comprise five segments; and the first module may scan each segment for a beacon signal in five successive beacon periods. Additionally, scans may not necessarily be conducted in successive beacon periods, which may allow in some instances sufficient time to process results of the scan.

In the device, the first module may repeat the scan for another channel associated with the network and may further repeat the beacon scan periodically if no appropriate beacon signal is received.

In the device, the first module may terminate the beacon scan when a connection carrying the A2DP data is terminated. The module may revert to an earlier (original) scanning scheme or switch to a different scheme when the connection is terminated.

In the device, the second module may provide a termination signal to the first module when the transmission is terminated.

In the device, the first module may further measure transmission characteristics of the beacon signal after it is received and may analyze the transmission characteristics to determine a source channel for the beacon signal.

In the device, the communication subsystem may process communications around the 2.4 GHz frequency band.

In other aspects, various combinations of sets and subsets of the above aspects are provided.

Exemplary details of embodiments are provided herein. Briefly an embodiment provides a method and system for a communication device to maintain a connection with two different networks at the same time. The connection requirements for each of the two networks can relate to specific requirements for each network.

First, a description is provided on general concepts and features of a device that provides connections to networks according to an embodiment, including related network connection requirements for the device for two different networks. Next, further detail is provided on a connection algorithm that seeks a connection to a network while maintaining a connection to another network, according to an embodiment. Then, further detail is provided on an exemplary wireless device related to an embodiment.

Figure 1:
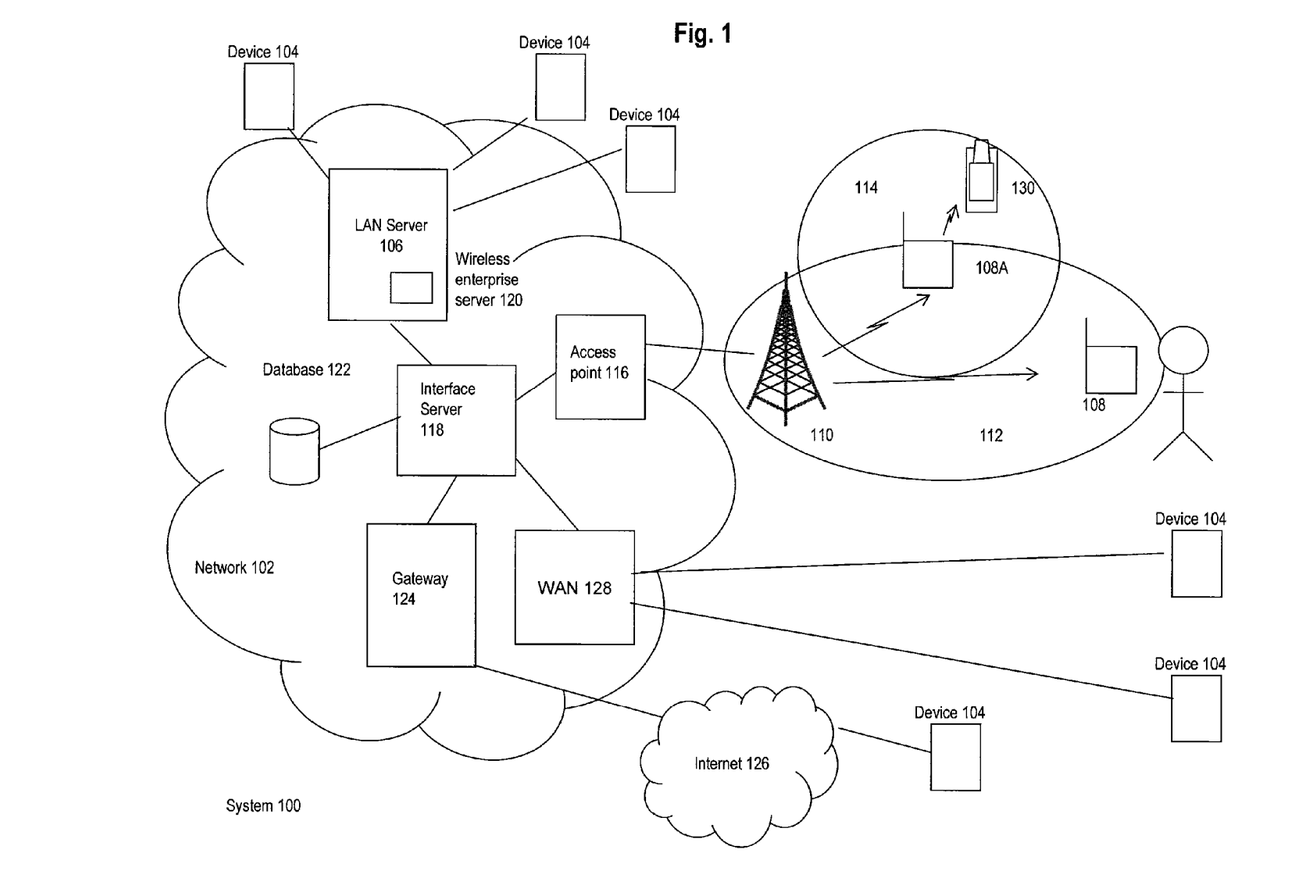
FIG. 1 is a schematic diagram of a communication network having a plurality of wireless networks therein that communicate with a wireless electronic communication device through a communication algorithm according to an embodiment.

Referring to FIG. 1, details on a system of exemplary networks and communication device that connects to the networks according to an embodiment are provided. FIG. 1 shows communication system 100 where network 102 provides a suite of applications, services and data to its connected devices 104 through its associated servers. Devices 104 connect to network 102 through wired connections to network server 106 which has software and hardware facilities to manage all communications of data and messages among devices communicating in network 102. Network 102 can be implemented in any known architecture, providing wired and/or wireless connections to its elements.

As part of a typical network architecture elements in system 100 are organized following a layered model of network functions, such as an OSI model. As is known in the art, the OSI model defines seven layers where each layer controls functions of specific network/connection/applications. Adherence to all necessary connectivity requirements for each layer is required if device 108 is to remain in communication with all relevant networks in system 100.

An OSI layer of particular relevance for an embodiment is the data link layer. For the data link layer, further detail is provided on an exemplary installation for network 110 relating to an embodiment. Network 110 is implemented as Wireless Fidelity (Wi-Fi) networks generally following standards set by the IEEE LAN/MAN Standards Committee, known as IEEE 802, through its working group "11". The 802.11 standard defines media access control (MAC) and physical (PHY) layers in the OSI protocol model for WLAN. Such standards are known to those of skill in the art. Administrative functions for network 110 may be provided by software controlling it. The software may administer functions such as network identification and network access parameters. The initial 802.11 standard was followed with a series of amendments, where each amendment was identified by an alphabetic suffix following in the standard's numeric identifier "802.11". The family of 802.11 amendments is sometimes referred to as the 802.11x family. Currently, the 802.11 amendments encompass six wireless modulation techniques that all use the same communication protocol among their communicating elements. Such networks are deployed in one or more of the five current versions of 802.11: 802.11a, b, g and n, representing PHY amendments to IEEE 802.11. There are other MAC amendments. Most North American 802-11x amendments dictate that transmissions are provided around the 2.4 GHz band, occupying a series of frequency bands in successive transmission channels. Specific transmission details and parameters of these networks and channels are known to those of skill in the art.

An OSI layer of particular relevance for an embodiment is the data link layer. Wireless devices 108 communicate with each other through the data link layer in network 110. In many environments, networks 110 are local, geographically small, wireless networks (such as wireless local area networks or WLANs), having coverage indicated by area 112. Wireless devices 108 include handheld devices, cell phones and computers (either desktop or portable) having a (wireless) network card, network adapter and/or network interface controller (NIC) installed therein.

Network 110 includes an antenna, access point (AP) 116 and supporting radio transmission equipment known to those skilled in the art. In an embodiment, each AP 116 is an IEEE 802.11 radio receiver/transmitter (or transceiver) and functions as a bridge between its respective WLAN 110 and network 102. For security, each AP 116 may be communicatively coupled to network 102 through a respective firewall and/or VPN (not shown). It provides data distribution services among devices 108 within network 110 and between devices 108 in network 110 and other devices in other connected networks. One distribution service provided by access point 108 for its related stations is to establish a logical connection between a device 108 and an access point.

Interface server 118 in network 102 provides hardware and software systems to allow network 102 to communicate with network 110. For communications directed to wireless devices 108, wireless services enterprise server 120 provides an interface with server 106 for transmissions destined to devices 108 and vice versa.

Database 122 provides a data storage system for one or more elements in network 102, including server 106. Security systems within network 102 can be provided by known techniques and systems. Gateway 124 provides and monitors selected communications between elements in network 102 and external devices connected through Internet 126.

For a 802.11 network, a "station" is a basic component in the network. A station is any device that implements the functionality of a 802.11 protocol and has a connection to the wireless network. Typically, the 802.11 connection and communication functions are implemented in hardware and software and may be provided in a network connection circuit or system in a NIC at the station. A station may be any device, including a laptop computer, handheld device 108, or an AP 116. Stations may be mobile, portable, or stationary. All stations support the 802.11 station services of authentication, de-authentication, privacy, and data delivery. For the purposes of an embodiment as it relates to 802.11 standards, devices 108 may be considered to be stations.

A service set identifier ("SSID") is a unique 32-character network name, or identifier, that is created and associated with a particular WLAN 110. The SSID can be any alphanumeric entry up to a maximum of 32 characters and is typically case sensitive. It may be set by a network administrator using network administration software for a control server of WLAN 110. The SSID should be chosen so that it differentiates one WLAN from another. As the SSID differentiates one WLAN from another, any APs and all wireless and other devices attempting to connect to a specific WLAN may require that a device provides the correct SSID for that WLAN before permitted the device to join that WLAN.

Further detail is now provided on messages generated and sent between components in WLAN 110. In a 802.11-class network, messages are sent between its AP 116 and its communicating devices 108 in data transmissions called frames. Most frames are sent and processed in a "send-and-respond" protocol. As such a frame may be sent by an AP 116 to one or more devices 108. When a device receives a frame, it extracts data from the frame and then it may generate a response. A similar communication dialog may be initiated by a device 108 to AP 116. Note that broadcast frames sent by an AP 116 are not acknowledged by stations 108. There are several classes of frames including control, management and data. Control frames assist in delivering data frames between stations. Management frames facilitate connection establishment and maintenance between a device 108 and AP 116. In particular, management frames have the following uses: they allow a device be associated, disassociated and re-associated to a network; they allow the device to be associated with a network; and they allow a device to initiate a probe request to an AP to request information about another device in a network. Frames may include additional information such as source and destination MAC addresses, a control field that provides information on the 802.11 protocol version, frame type and other status indicators. It will be appreciated that a person of skill in the art has knowledge of the protocols of the frames. Additional materials relating to same are provided in published 802.11 Working Group materials.

A beacon frame is a type of a management frame that is periodically broadcast by an AP 116 to provide a signal of its presence to the communication boundaries of its network. The typical period of transmission of a beacon frame is about every 100 ms. 802.11 standards set the period to be exactly 102.4 ms. It will be appreciated that there will be an acceptable variance in the exact period used in an embodiment, which may be in the range of 10% from the standard period. The body of a beacon frame contains: a beacon interval, providing the amount of time between beacon transmissions; a timestamp, which may be used by a station to synchronize itself and update its local clock; and the SSID of the WLAN 110 of the AP 116. The beacon frame can also provide: data indicating the supported transmission rates of the WLAN; data regarding the signalling parameters of the WLAN, such as frequency hopping spread spectrum, direct sequence spread spectrum, etc.; data on the capabilities of the WLAN; and data providing a traffic indication map (TIM). The beacon frame includes a frame header and cyclic redundancy checking (CRC) field. The destination address of the frame is set to all 1's, which is the broadcast MAC address. This will cause all other stations on the applicable channel to process a received beacon frame. The beacon frame may also contain a Delivery TIM (DTIM) which is a flag indicating whether any buffered broadcast or multicast traffic is going to be transmitted from the AP 116 to device 108 immediately (or shortly) after the beacon signal.

A beacon frame is used as a synchronizing signal for transmitting broadcast and multicast traffic to devices in the associated network. Immediately following the beacon frame, if broadcast or multicast traffic is queued to be provided, such traffic is transmitted by AP 116 through its network 112. Multicast traffic is queued for transmission by AP 116 only if its requested recipient device 108 has positively responded to an early request by AP 116 to transmit that multicast traffic to it. Broadcast traffic is broadcast to the devices 108 without any request signal sent by AP 116. The broadcast or multicast traffic can contain data from other layers in the communication network, such as the IP layer.

Further detail is now provided on how a device 108 interacts with AP 116 when entering the coverage area of network 110. Each device 108 that enters a coverage area 112 needs to become associated with the related AP 116 before a communication connection is made to network 110. Once an association is made, AP 116 is able to use identification data relating to device 108 to determine where and how to deliver data to that device 108. As a device 108 roams into the coverage area 112, it periodically scans for any beacon signals on some or all channels on one or more classes of 802.11 network(s). When a beacon is found, the device extracts data parameters of particular network. Once the data is extracted, device 108 can analyze the data and adjust parameters of the power save mode accordingly.

As noted earlier, as part of the data link layer, AP 116 will periodically send broadcast/multicast packets towards device 108 at intervals determined, in part, by the value of the DTIM field. As such, for the power-down mode for device 108, it must be synchronized such that device 108 is able to receive and respond to such beacon signals and receive, as required, the broadcast/multicast traffic that proceeds them.

In addition to network 110, device 108 may be able to communicate with a Personal Area Network (PAN). Further detail is provided on an exemplary PAN, namely Bluetooth (trademark) network 114. Network 114 allows device 108 to wirelessly communicate with other Bluetooth-enabled devices that are in communication range with each other. Three classes of Bluetooth-enabled devices are provided, such that a Bluetooth device may have a communication range of approximately 1, 10 or 100 meters with other Bluetooth-enabled devices. One commonly used wireless channel for Bluetooth transmissions in network 114 is centered around the 2.4 GHz band.

One exemplary Bluetooth enabled device that communicates with device 108A is headset 130. Headset 130 has Bluetooth enabled firmware and transmission modules to communicate with device 108. When device 108 is in communication with headset 130, music or other audio data may be streamed from device 108 to headset 130 in an Advanced Audio Distribution Profile (A2DP) format, per the known Bluetooth protocol. A2DP provides a two-channel audio stream from device 108 to headset 130 over the communication subsystem of device 108A. A2DP provides a defined protocol for establishing and terminating a connection between two devices. The protocol also defines how communications are handled between the devices. Once a connection has been established, transmissions of data and other signals can be sent between the devices and can include data for the audio stream. It has been observed that an audio stream does not tolerate transmission gaps of approximately 20 ms or more without there being a noticed impact on the audio quality by the user of headset 130. As such, it is preferable that this gap be avoided in operation of device 108 while it is transmitting to headset 130.

Further detail is now provided on overlapping connection requirements for networks 110 and 114 as managed by device 108. It has been noted earlier that both network 110 and 114 use transmission signals around the 2.4 GHz range. Device 108 has an internal antenna and communication subsystem that allows it to receive and transmit appropriately modulated 2.4 GHz-based signals to each network 110 and 114 (see communication subsystem 404, FIG. 4, described below). In order to economize on parts count, one communication subsystem is used for all signals for all types of networks that utilize the 2.4 GHz transmission band. As such, generally device 108 cannot communicate with both networks 110 and 114 simultaneously and an embodiment manages transmissions for each network to manage any communication or connection requirements or conflicts that may need to be addressed when handling communications and connection requirements for multiple networks through one communication subsystem. Generally radio transmissions are provided as either a single antenna or a dual antenna mode. In the single antenna mode, device 108 has to separate all WLAN and Bluetooth transmissions and receptions. In the dual-antenna mode, device 108 may receive on both radios, but it can only transmit on one radio at a time.

Further detail on an embodiment is now provided having regard to connection requirements for network 110. When device 108 has been in communication with network 110, but at some point lost its connection, the Wi-Fi protocol has a predefined scanning methodology that device 108 should use to re-establish a connection with network 110. The re-connection algorithm involves having device 108 rescan for beacon signals from APs 116. The re-scan may be active or passive. In a passive scan the communication subsystem of device 108 is placed in a receive mode to scan for beacon signals from AP 116. For an active scan, its period is generally shorter than a passive scan (i.e. having a period of approximately 12 ms).

As noted earlier, beacon signals are transmitted at a frequency of once every 102.4 ms under 802.11 constructs. One coarse passive scan algorithm is to have device 108 utilize its communication subsystem to scan the related Wi-Fi channels of the 2.4 GHz band for beacons continuously until a beacon is received. When a beacon is received, device 108 can then respond appropriately to the beacon to re-establish the connection to device 108. The duration of the passive scan as described would scan for at least one period of time in which the beacon signal is expected to be transmitted, namely for at least a 102.4 ms period. As noted earlier, if a Bluetooth audio stream between device 108 and headset 130 provides degraded audio signals is there is a gap in the transmission from device 108 of about 20 ms or more. As such, if device 108 is conducting a continuous passive Wi-Fi scan during its transmission of a Bluetooth audio stream, the audio quality of the audio stream may be affected. Accordingly, an embodiment implements a scanning algorithm in device 108 to provide a passive scan for networks, such as Wi-Fi networks, while also maintaining transmission quality standards for another network, such as Bluetooth network 114. Generally, an embodiment conducts a first activity (such as a passive scan) to maintain or establish a first connection to first network (such as an 802.11 network) in a series of spaced, timed segments, such that the series of spaced, timed segments represent a timeframe of an original activity that would span a continuous period (such as a prior art passive scan) that would cause a transmission conflict with a second network (such as to Bluetooth network 114). Also, an embodiment would conduct a second activity relating to the second network (such as to transmit A2DP data) between two of consecutive segments of the series of spaced, timed segments.

Figure 2A:
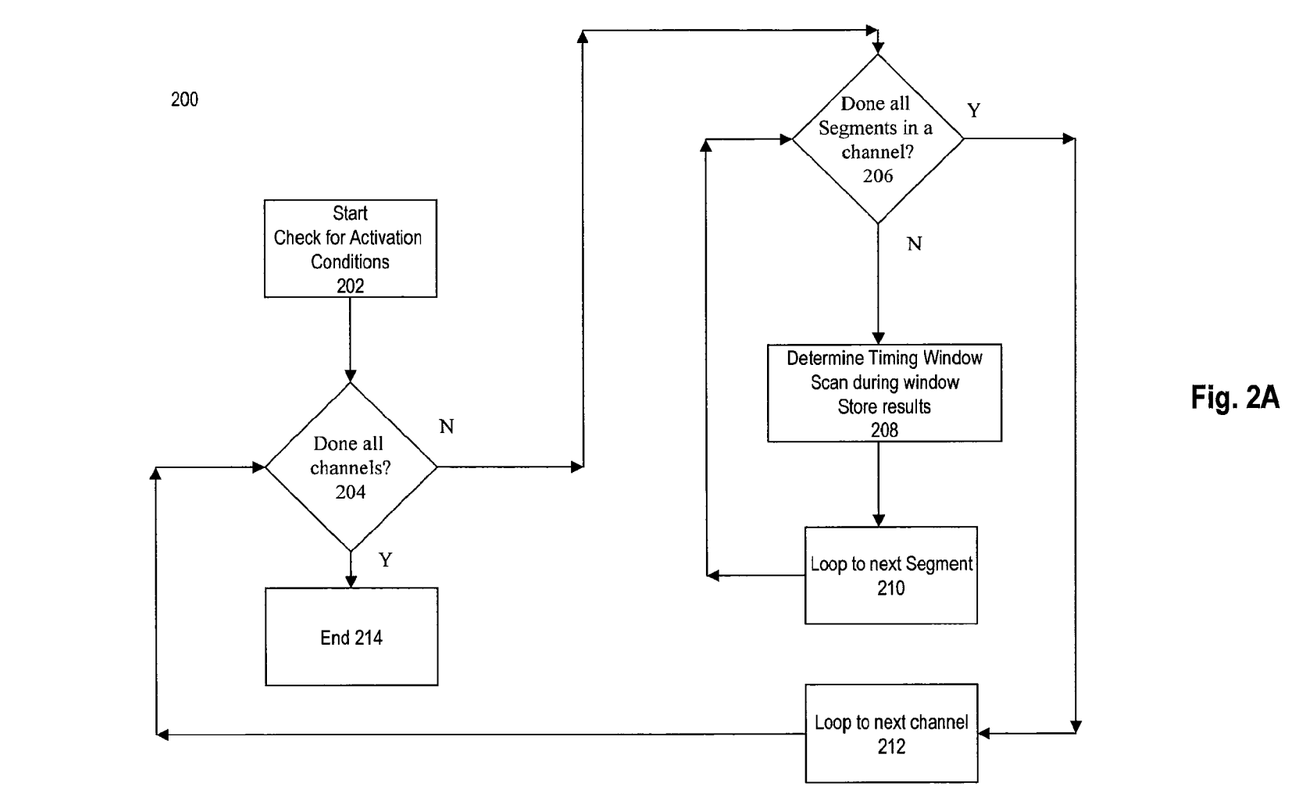
FIG. 2A is a flowchart of exemplary steps executed by the communication algorithm of the device of FIG. 1 in seeking a connection to a network according to an embodiment.

Referring to FIG. 2A, process 200 shows an algorithm according to an embodiment operating on device 108 that provides a scanning algorithm as noted above. Briefly, instead of implementing one continuous scan over one beacon period for a Wi-Fi beacon in network 110, a scan is conducted in successive segments of a beacon period over several periods, such that over the course of the several periods, each segment has been scanned, thereby effective providing a scan of an entire beacon period, albeit not necessarily in one period. Namely, if the successive segments were extracted from the consecutive beacon periods and mapped into one notional beacon period, the successive segments provide a scan of the notional beacon period. Consecutive segments may overlap with each other in a relative position within the notional beacon period. The size and spacing of the segments may be designed such that when consecutive segments are aligned in a single notional beacon period, edges of consecutive segments overlap.

Process 200 is organized as a series of nested loops. First at step 202, process 200 starts by checking for activation conditions for the process. The current scanning mode of device 108 may be stored for later retrieval. After the conditions are met, step 204 starts a main loop to scan each channel of the particular 802.11-class amendment. Step 206 starts a nested loop to scan one segment of a beacon period the current channel. At step 208, a timing window is determined to fix a scan window for a beacon signal. The timing window is based on the current segment of the beacon period, as provided by the nested loop. Then a scan is conducted during the timing window for a beacon signal. The results of the scan are stored. Next at step 210, the nested loop cycles to the next segment in the beacon period. As the nested loop iterates through step 208, the timing window will slide through each segment of the beacon period for the currently monitored channel. Next at step 212, the main loop cycles to scan the next channel for the network. As the main loop iterates through the channels, all channels for the current Wi-Fi network will be monitored for a beacon signal. When all channels have been scanned, process 200 ends at step 214.

As process 200 stretches the scanning period over multiple beacon periods, it will be appreciated that there would not be any expected significant issue in skipping some beacons during in this scanning mode. As a coverage precaution, the time to start/end scanning for a beacon for a particular window may have some overlap with the immediately preceding/following segment in order to provide some overlapping scanning coverage between borders of segments.

The complete cycle of scans for channels may be repeated periodically if no beacon signal is detected. For example, a set of scans may be repeated every 2 to 3 minutes for each cycle. Additionally or alternatively, the frequency of repetition for the cycles can vary. One embodiment may utilize a back-off scheme where the frequency of repetition is more frequent at the beginning and then the frequency drops as time progresses. For example, the cycle may be repeated every minute initially, then taper to every 2 to 3 minutes as time progresses, if no beacon has been received.

For an exemplary Wi-Fi network, process 200 may segment the 102.4 ms beacon period into five segments of 21 ms each. Five segments of 21 ms provides a scanned time of 105 ms, which is greater than the beacon period of 102.4 ms. This excess time is tolerated by the embodiment. Process 200 may be implemented as per the following pseudo code:

```
For each Wi-fi channel to be scanned
    For segment number (SN) = 1 to 5
        start a timer for a length = n *100 +SN* 21 ms,
                where n is an integer
        upon the expiry of the timer
        scan for 21 ms for a beacon
        wait for scan result
        store scan result
    Next segment
Next channel
```

It is notable that the scan results may be delayed. Also, n is an integer that may vary among implementations.

As noted above, one condition for activation of this scanning mode is that it is used only when device 108 has a conflict with another network that requires certain bandwidth on the same (2.4 GHz) channel, such as upon the activation of the A2DP Bluetooth playback mode for headset 130. In order to coordinate the scanning mode used and the state of device 108, a Bluetooth communication module (BCM 420M, FIG. 4) in device 108 send a data message to the WLAN communication module (Wi-Fi module 420N, FIG. 4), indicating that A2DP is active from device 108 to headset 130. Similarly, when A2DP is deactivated by negotiations or by either device 108 or headset 130, the BCM 420M would send another data message to the WLAN connection module indicating same. Upon receipt of the message, device 108 can selectively terminate the current scanning mode and then revert to a different scanning mode, including a passive mode where scans are conducted for a continuous period spanning a beacon period and an scanning mode that was used prior to the current segmented scan. The receipt of such a message may occur at any time. As such, process 200 may be aborted at any time of shortly after the receipt of such message.

As such, it can be seen that an embodiment provides is a scanning mode that is activated when an A2DP connection is initiated, which terminates when the A2DP connection is terminated. Within that scanning mode, a scan may be made by disabling the transmission of A2DP data during the scan (i.e. during the window). The embodiment may automatically switch control of the communication subsystems from BFM 420M to WFM 420N during transmission of A2DP data for a scan window. When the scan window is sufficiently short (e.g. approximately 23 ms or less), the gap in A2DP transmissions from BFM 420M is not noticeable. If a window is too large, a particular beacon scan should not be made when transmission of A2DP data is occurring over its connection.

It will be appreciated that other embodiments may alter the number of segments and the ordering of how the segments are scanned. For practical purposes, it is possible to use a segment that is slightly longer than the noted 20 ms A2DP window, such as 25 ms. Shorter or longer segments may be used (e.g. 23 ms, 21 ms slots, 50 ms slots, etc.). Also, an embodiment may skip scanning some segments of a beacon period, in order to shorten the number of scans conducted, thereby taking a statistical chance that the beacon signal is not received during the skipped segment. Further still, in other embodiments, after one complete scan is conducted using one size of segments, if no beacon signal has been detected, the size of the segment may be increased or decreased, the scanning algorithm may be adjusted to conform to the new segment size and then the scanning may be repeated using the new segment parameters.

Turning now to a further embodiment, it is noted that in the 2.4 GHz band, some of the WLAN channels overlap. Non-overlapping channels currently are restricted to channels 1, 6, and 11. Many WLAN communication subsystems can receive traffic transmitted on adjacent channels. Typically, scanning channel 1 covers channels 1-3; scanning channel 6 covers channels 4-8; scanning channel 11 covers channels 9-11. Communication chipsets from vendors such as Atheros and Broadcomm provide components providing such capabilities. Any traffic received from an adjacent channel is typically attenuated from expected traffic on the current channel.

As such, an embodiment may take advantage of the overlapping channels, by configuring the WLAN communication subsystem in device 108 to capture beacons from AP 116 on adjacent channels to pare down the channel list for scanning for the main loop of process 200. For example, in a first scan, the communication subsystem may tune itself to passively scan channels 1-5 for beacons; on a next scan, the subsystem may passively scan channels 6-10; and on the final scan, subsystem may tune to passively scan channels 11-14. Other patterns may be scanned, for example successively scanning channels 1, 3, 4, 6, 8, 9 and 11.

If a beacon is received, the beacon frame provides the channel number of the transmitting AP. This number can be analyzed to determine if the received beacon emanates from an off-channel AP. If the beacon is an off-channel AP, device 108 can then actively probe the channel indicated in the beacon to determine more accurate received strength signal indicator (RSSI) information for the received beacon.

In order to coordinate transmissions among different networks, transmissions for Bluetooth network 114 and WLAN network 110 are timed so that the Bluetooth communication module and the WLAN communication module do not transmit at the same time.

It will be appreciated that other embodiments may have the elements of process 200 in different orders or may have more or less steps and tests therein. Process 200 may be atomized and may be executed by one or more evaluation, monitoring and command initiation processes operating on device 108. Also, process 200 may operate in the background on device 108.

Figure 2B:
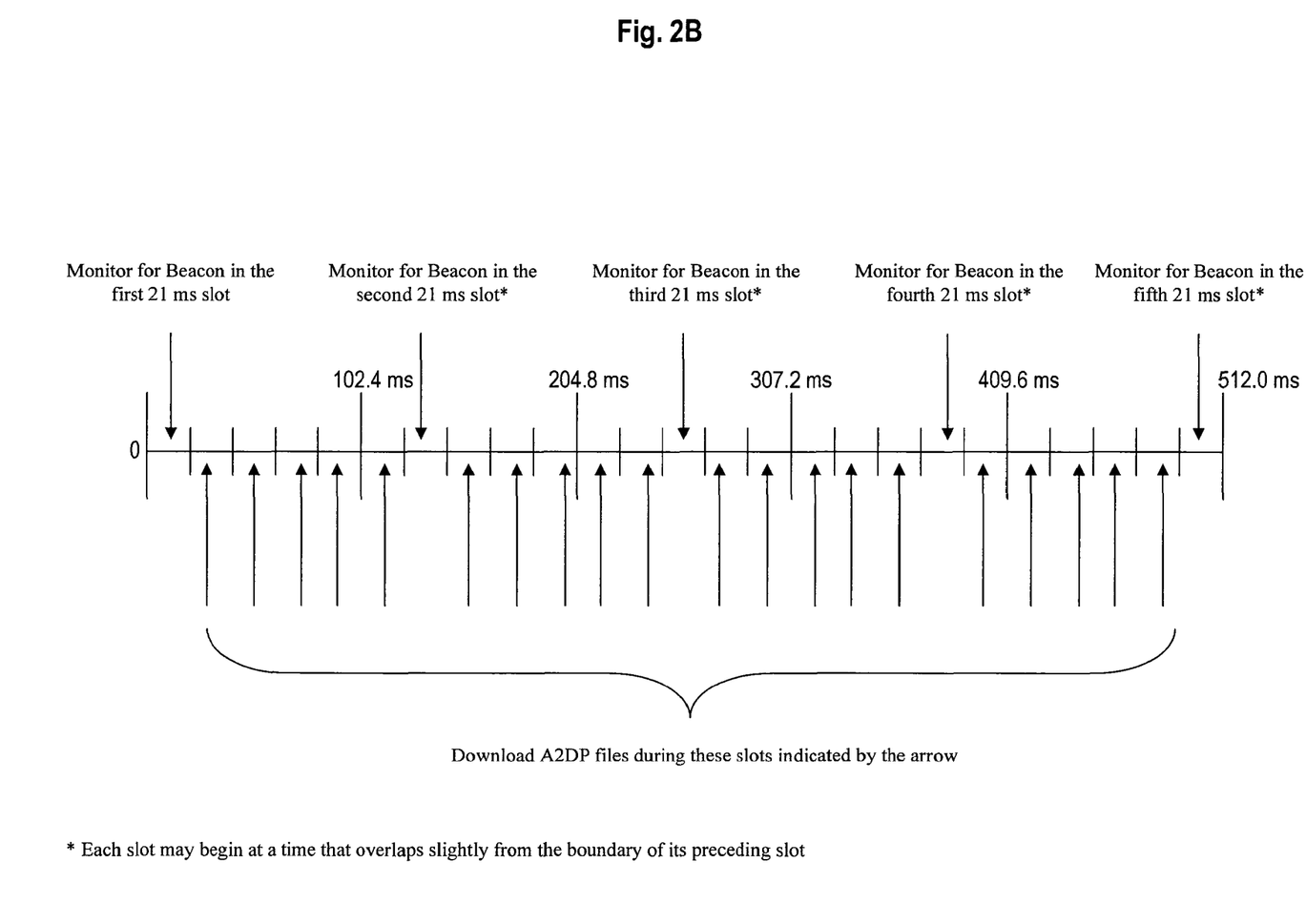
FIG. 2B is a timeline of scanning cycles implemented by the communication algorithm of the device of FIG. 1 according to an embodiment.

Referring to FIG. 2B, timeline 210 shows an exemplary timeline of activations of the communication subsystems 404 and 406 according to an embodiment. To begin, it is presumed that the device 108 is utilizing, thereby initiating a monitoring window of every 21 ms within a particular 102.4 ms frame. The window slides forward one slot in each successive frame. It will be appreciated that in other embodiments other granularities of slots can be provided. The slots do not necessarily have to be the same size. The scanning algorithm can scan the slots in any order (e.g. forward, backward or other). One implementation uses windows that are 21 ms large. Multiple scans may be conducted using different modes in combination. During non-scanning slots, device 108 may communicate with network 114, and may download A2DP files to device 130.

To assist with management of a scanning mode arrangements, a software application referred to herein as a scanning management module may be provided in device 108. Management of input and display of the scanning parameters may be provided through a graphical user interface (GUI) as part of that module. In the GUI, screen may be provided implementing selection and activation criteria for one or more scanning modes may be provided using the parameters described herein. Once the parameters for the scanning modes are entered, other processes and systems on device 108 may monitor for various conditions relating to the status of all various levels of connections for a network and then compare the connections against the activation conditions set in the scanning system. If an activation condition is satisfied, the other processes can recognize this state and then proceed to selectively stop the scanning process or modify its algorithm.

Figure 3:
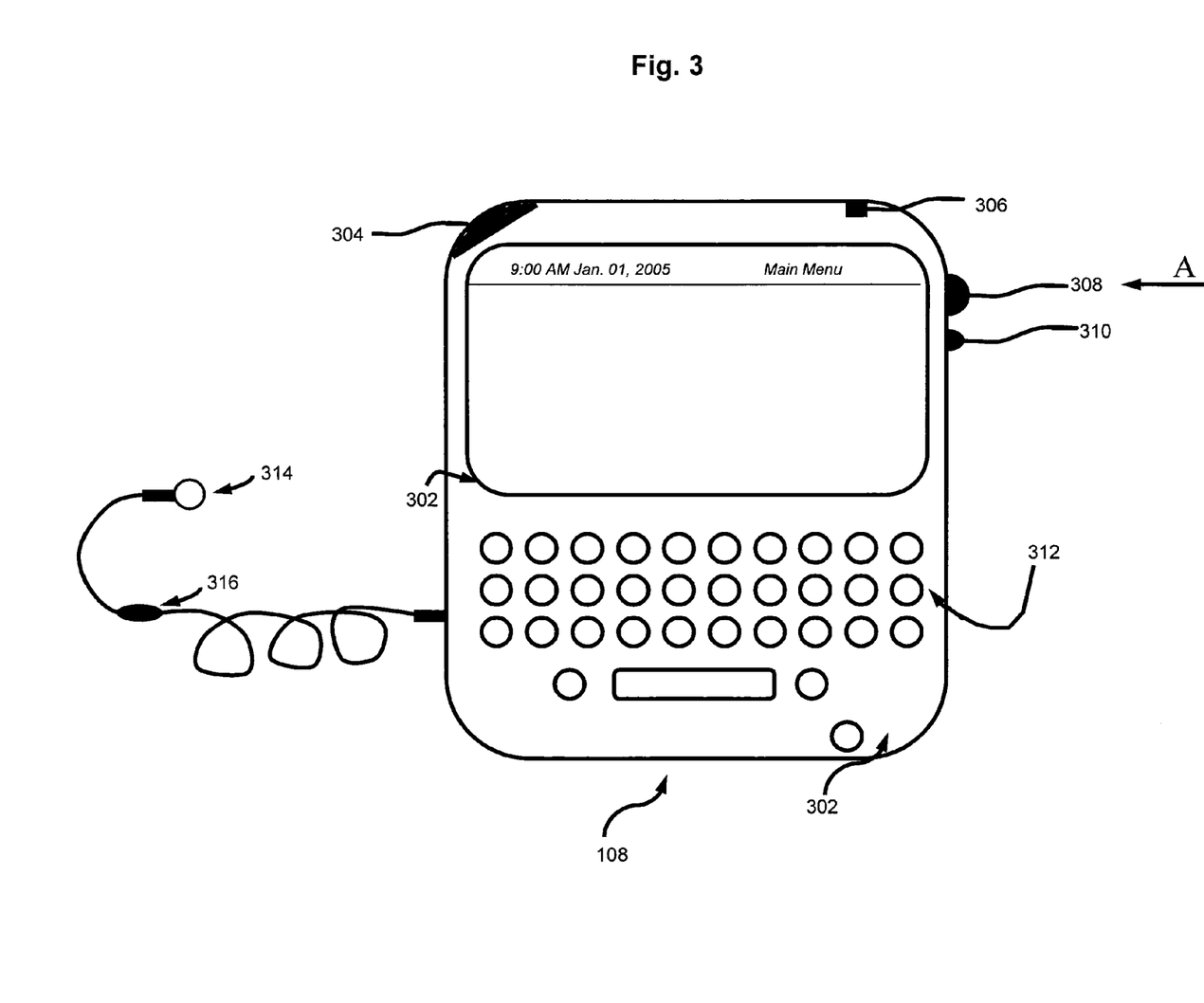
FIG. 3 is a schematic representation of the device of FIG. 1 providing a communication algorithm according to an embodiment.

FIG. 3 provides general features of an electronic device for processing electronic communications in accordance with an embodiment of the invention, which is indicated generally at 108. In the present embodiment, device 108 is based on a computing platform having functionality of an enhanced personal digital assistant with cellphone and e-mail features. It is, however, to be understood that device 108 can be based on construction design and functionality of other electronic devices, such as smart telephones, desktop computers, pagers or laptops having telephony equipment. In a present embodiment, electronic device 108 includes a housing 300, an LCD 302, speaker 304, an LED indicator 306, a trackball 308, an ESC ("escape") key 310, keypad 312, a telephone headset comprised of an ear bud 314 and a microphone 316. Trackball 308 and ESC key 310 can be inwardly depressed along the path of arrow "A" as a means to provide additional input to device 108.

It will be understood that housing 300 can be made from any suitable material as will occur to those of skill in the art and may be suitably formed to house and hold all components of device 108.

Device 108 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.11), Wireless PAN (IEEE 802.15 and Bluetooth), etc. and any others that support voice. Additionally, a Bluetooth network may be supported. Other embodiments include Voice over IP (VoIP) type streaming data communications that can simulate circuit-switched phone calls. Ear bud 314 can be used to listen to phone calls and other sound messages and microphone 316 can be used to speak into and input sound messages to device 108.

Figure 4:
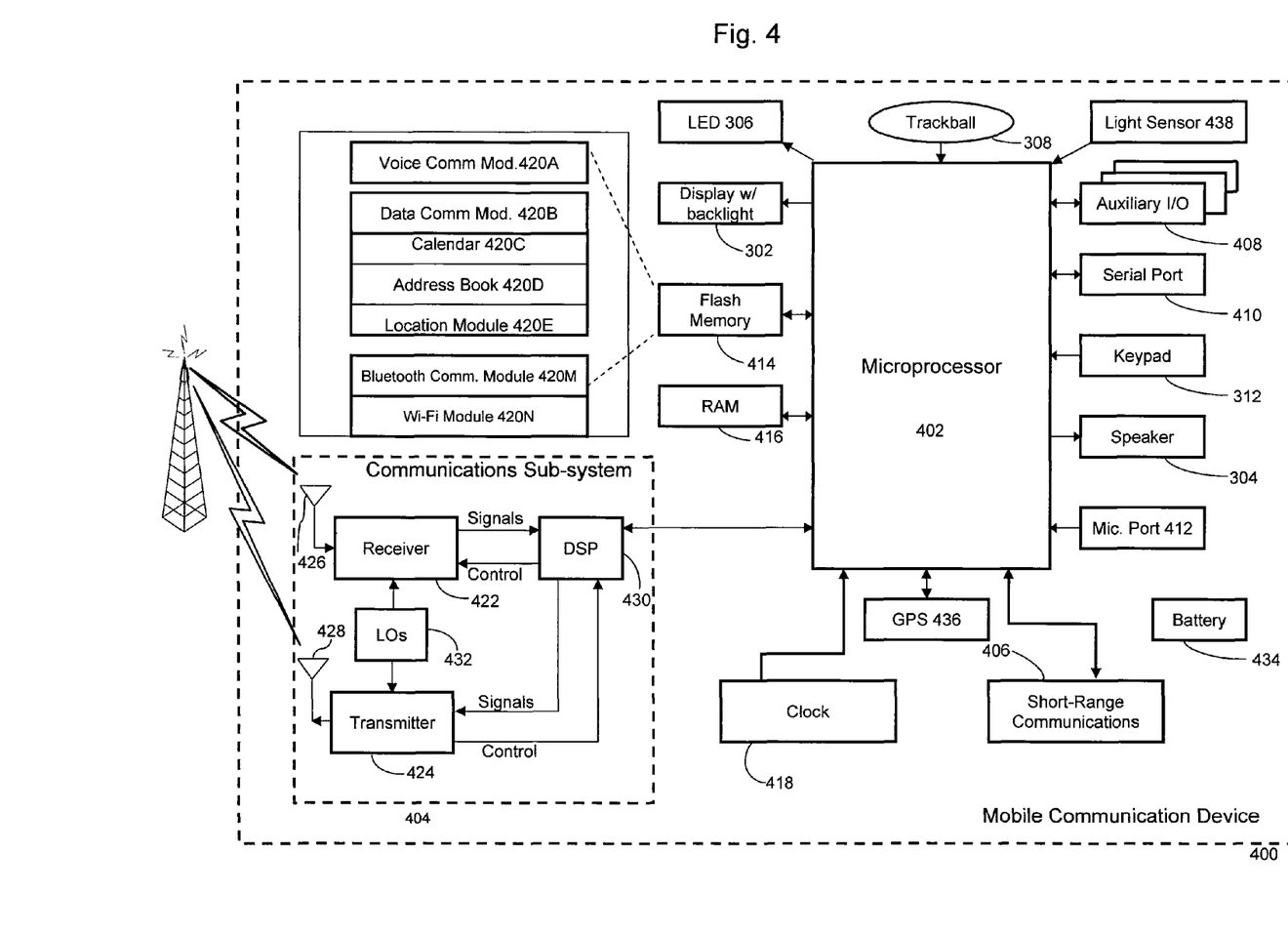
FIG. 4 is a block diagram of certain internal components of the device of FIG. 3.

Referring to FIG. 4, functional components of device 108 are provided in schematic 400. The functional components are generally electronic, structural or electro-mechanical devices. In particular, microprocessor 402 is provided to control and receive almost all data, transmissions, inputs and outputs related to device 108. Microprocessor 402 is shown schematically as coupled to keypad 312 and other internal devices. Microprocessor 402 preferably controls the overall operation of the device 108 and its components. Exemplary microprocessors for microprocessor 402 include microprocessors in the Data 950 (trade-mark) series, the 6200 series and the PXA900 series, all available at one time from Intel Corporation. Microprocessor 402 is connected to other elements in device 108 through a series of electrical connections to its various input and output pins. Microprocessor 402 has an IRQ input line which allows it to receive signals from various devices and modules. Appropriate interrupt firmware is provided which receives and reacts to the signals detected on the IRQ line. An interrupt signal may be used to indicate a request to terminate the segmented scanning mode of an embodiment.

In addition to the microprocessor 402, other internal devices of the device 108 are shown schematically in FIG. 3. These include: display 302; speaker 304; keypad 312; communication sub-system 404; short-range communication sub-system 406; auxiliary I/O devices 408; serial port 410; microphone port 412 for microphone 316; flash memory 414 (which provides persistent storage of data); random access memory (RAM) 416; clock 418 and other device sub-systems (not shown). Device 108 is preferably a two-way radio frequency (RF) communication device having voice and data communication capabilities. In addition, device 108 preferably has the capability to communicate with other computer systems via the Internet.

Operating system software executed by the microprocessor 402 is preferably stored in a computer-readable medium, such as flash memory 414, but may be stored in other types of memory devices, such as read-only memory (ROM) or similar storage element. In addition, system software, specific device applications, or parts thereof, may be temporarily loaded into a volatile store, such as RAM 416. Communication signals received by the mobile device may also be stored to RAM 416.

In addition to an operating system operating on device 108, additional software modules 420 enable execution of software applications on device 108. A set of software (or firmware) applications, generally identified as applications 420, that control basic device operations, such as voice communication module 420A and data communication module 420B, may be installed on the device 108 during manufacture or downloaded thereafter. As well, other software modules are provided, such as calendar module 420C, address book 420D and location module 420E.

Bluetooth connection module (BCM) 420M is software and/or firmware that provides the processes that control how and when connections and communications are conducted between device 108 and a detected Bluetooth enabled device, such as headset 130 in its local PAN 114. For example, BCM 420M may control the contents and downloads for streamed audio transmitted to device 130. Communications are streamed through either communication module 404 or 406. BCM 420M also provides signals to other modules to synchronize its communication status with other components in device 108, thereby enabling the other components to have knowledge as to the status of any Bluetooth devices 130 that are currently communicating with device 108. BCM 420M may also receive signals from other modules providing information to it on other modules that are using communication module 404 or 406. As such, in one embodiment, BCM 420M may initiate, change, delay, halt or continue with processing its data for transmission by module 404 or 406 to synchronize transmission of its data in view of the availability of modules 404 or 406 or signals received from other modules. In one embodiment, processing of its data stream (e.g. the A2DP data) by BCM 420M is not halted when another module (e.g. WFM 420N) transmits its data, but instead the final step of activating module 404 or 406 by BCM 420M for transmission of its data is not done.

Wi-Fi module (WFM) 420N is software and/or firmware that provides processes to detect and analyze when device 108 is in communication contact with one or more networks 110 and determine the parameters of each communicating network 110 both at the data link layer and the IP connection layer. It may also control when to seek a connection to a particular network and when to enter, activate, deactivate a scan for a network as described earlier. When WFM 420N is used to monitor 802.11x networks and issue commands relating thereto, the monitoring of signals and the initiation of commands may follow the functional requirement of 802.11 frames as noted earlier. WFM 420N also has the ability to selectively activate and deactivate parts of the components providing communication functions described below. In some embodiments, WFM 420N provides support for the IP stack and the communication (radio) drivers as well as their management. In other embodiments, WFM 420N provides support for the IP stack and the related radio drivers alone. The data relating to the strengths of received signals may also be processed by WFM 420N to determine source of the signals. As described earlier, WFM 420N also has system and processes that controls the activation of the subsystems 404 and 406. Also, WFM 420N may also receive signals from other modules providing information to it on other modules that are using communication module 404 or 406. As such, WFM 420N may initiate, change, delay, halt or continue to synchronize its monitoring of a signal from module 404 or 406 in view of the availability of modules 404 or 406 or the status of another module.

Additional modules such as personal information manager (PIM) application may be provided. Any module may be installed during manufacture or downloaded thereafter into device 108.

Data associated with each application, the status of one or more networks, profiles for networks and trigger conditions for commands for networks can be stored and updated in flash memory 414.

Communication functions, including data and voice communications, are performed through the communication sub-system 404 and the short-range communication sub-system 406. Collectively, sub-systems 404 and 406 provide the signal-level interface for all communication technologies processed by device 108. Various applications 420 provide the operational controls to further process and log the communications. Communication sub-system 404 includes receiver 422, transmitter 424 and one or more antennas, illustrated as receive antenna 426 and transmit antenna 428. In addition, communication sub-system 404 also includes processing modules, such as digital signal processor (DSP) 430 and local oscillators (LOs) 432. The specific design and implementation of communication sub-system 404 is dependent upon the communication network in which device 108 is intended to operate. For example, communication sub-system 404 of device 108 may operate with the Mobitex (trade-mark), DataTAC (trade-mark) or General Packet Radio Service (GPRS) mobile data communication networks and also operate with any of a variety of voice communication networks, such as 802.11 networks, Bluetooth networks, Advanced Mobile Phone Service (AMPS), Time Division Multiple Access (TDMA), Code Division Multiple Access (CDMA), CDMA 2000, Personal Communication Service (PCS), Global System for Mobile Communication (GSM), WWAN (cellular), WMAN (Wi-max), WLAN (Wi-Fi), and WPAN (Bluetooth) in other disclosures, etc. Other types of data and voice (telephonic) networks, both separate and integrated, may also be utilized with device 108. In any event, communication sub-system 404 provides device 108 with the capability of communicating with other devices using various communication technologies, including instant messaging (IM) systems, text messaging (TM) systems and short message service (SMS) systems.

Short-range communication sub-system 406 enables communication between device 108 and other proximate systems or devices, which need not necessarily be similar devices. For example, the short-range communication sub-system may include an infrared device and associated circuits and components, a Wi-Fi or a Bluetooth (trade-mark) communication module to provide for communication with similarly enabled systems and devices. Sub-system 406 may have one or more inputs or outputs to sub-system 404 in processing signals for its networks.

As noted, BCM 420M and WFM 402N should not initiate their transmissions at the same time. They can communicate their respective actions and status to each other using general purpose input/output (GPIO) lines, such as TX_BT, TX_WLAN, to and from each respective chipset of each module. The IEEE 802.15.1 specification describes an implementation for Bluetooth-WLAN co-existence.

In addition to processing communication signals, DSP 430 provides control of receiver 426 and transmitter 424. For example, gains applied to communication signals in receiver 426 and transmitter 424 may be adaptively controlled through automatic gain-control algorithms implemented in DSP 430. One particular operational aspect of receiver 422 and antenna 426 is that they need to be tuned to receive signals in the 802.11 network bands, e.g. signals in the 2.4 GHz to 5.8 GHz range for sub-systems 406 and if needed, sub-system 404. Additional filters on antenna may also be used to provide such functionality.

Receiver 422, antenna 426, BCM 420M and WFM 420N provide at least some of the hardware and software elements needed to detect when device 108 is in the presence of communication signals from networks 114 and 110, thereby enabling device 108 to communication with other devices in networks 114 and 110.

Powering the entire electronics of the mobile handheld communication device is power source 434. In one embodiment, the power source 434 includes one or more batteries. In another embodiment, the power source 434 is a single battery pack, especially a rechargeable battery pack. A power switch (not shown) provides an "on/off" switch for device 108. A power source interface (not shown) may be provided in hardware, firmware, software or a combination of such elements to selectively control access of components in device 108 to power source 434. Upon activation of the power switch an application 420 is initiated to turn on device 108. Upon deactivation of the power switch, an application 420 is initiated to turn off device 108. Power to device 108 may also be controlled by other devices and by software applications 420.

Device 108 may also have global positioning system 436 to assist in identifying a present location of device 108 and may also have light sensor 438 to provide data on the ambient light conditions for device 108.

Although an embodiment has been described in terms of establishing/maintaining a connection for an 802.11 network and a connection to a Bluetooth network, the features of an embodiment can be provided in coordinate aspects of different connections among different networks. A notable feature of an embodiment is that more than one connection requirement for one network is maintained while a device is handling another requirement for another network. However, in other embodiments, the two connection conditions may relate to one network. A connection requirement for a network may cover any scenario, including how the connection is initiated, sought, maintained or terminated.

It will be appreciated that BCM 420M, WFM 420N and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. For example, detection of a beacon signal and/or the initiation or completion of a A2DP download to headset 130 from device 108 as described in FIG. 2A may cause an interrupt to be generated on microprocessor 402 and a particular interrupt routine may be provided to process the event. It will further be appreciated that other applications and systems on device 108 may be executing concurrently with Bluetooth module 402M, WFM 420N or other modules. As such, BCM 420M and WFM 420N may be structured to operate in as a "background" application on device 108, using programming techniques known in the art.

Further in other embodiments, scanning modes may be designed to work with Wi-Max networks, i.e. 802.16-class networks, in place of 802.11-class networks. Scanning modes may also be provided for an active scan, where its scan is segmented.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

The invention claimed is:

1. A method of communicating with a 802.11-class network and processing communications with a Bluetooth network by a communication device, comprising:
    conducting a passive beacon scan in a channel of a 802.11-class network to maintain or establish a first connection with said 802.11-class network through a series of spaced, timed segments, such that said series of spaced, timed segments represent a timeframe of an original activity that would span a continuous period that would cause a transmission conflict with a second connection with said Bluetooth network; and
    transmitting Advanced Audio Distribution Profile (A2DP) data for a second device in said Bluetooth network relating to an audio file to said Bluetooth network from said communication device between two of consecutive segments of said series of spaced, timed segments and not during said passive beacon scan,
    wherein
        said series of spaced, timed segments comprises at least five segments, with each segment of said series being less than 23 ms in length;
        each segment of said at least five segments is scanned for a beacon signal in at least five successive beacon periods for said 802.11-class network; and
        said original activity is a continuous passive beacon spanning one notional beacon period for said 802.11-class network.

2. The method of communicating with a 802.11-class network and processing communications with a Bluetooth network by a communication device as claimed in claim 1, wherein consecutive segments of said series of spaced, timed segments overlap with each other when mapped to said notional beacon period.

3. The method of communicating with a 802.11-class network and processing communications with a Bluetooth network by a communication device as claimed in claim 1, wherein said scan is repeated for another channel associated with said 802.11-class network.

4. The method of communicating with a 802.11-class network and processing communications with a Bluetooth network by a communication device as claimed in claim 1, wherein said method is repeated periodically if no appropriate beacon signal is received.

5. The method of communicating with a 802.11-class network and processing communications with a Bluetooth network by a communication device as claimed in claim 1, wherein said scan is terminated when a connection carrying said A2DP data is terminated.

6. The method of communicating with a 802.11-class network and processing communications with a Bluetooth network by a communication device as claimed in claim 1, wherein said scan is replaced with an earlier scheme when a connection carrying said A2DP data is terminated.

7. The method of communicating with a 802.11-class network and processing communications with a Bluetooth network by a communication device as claimed in claim 1, further comprising measuring transmission characteristics of said beacon signal after said beacon signal is received and analyzing said transmission characteristics to attempt to determine a source channel for said beacon signal.

8. A communication device for communicating with a 802.11-class network and processing communications with a Bluetooth network, comprising:
    a communication subsystem providing transmission and reception of signals with said 802.11-class and Bluetooth networks;
    a microprocessor;
    a timer;
    a first module to control a first connection with said 802.11-class network utilizing said communication subsystem, said first module conducting a passive beacon scan in a channel of said 802.11-class network to maintain or establish said first connection in a series of spaced, timed segments, such that said series of spaced, timed segments represent a timeframe of an original activity that would span a continuous period that would cause a transmission conflict with said Bluetooth network; and
    a second module to control a second connection with said Bluetooth network utilizing said communication subsystem, said second module transmitting data relating to an audio file to said Bluetooth network from said communication device between two of consecutive segments of said series of spaced, timed segments and not during said passive beacon scan,
    wherein
        said series of spaced, timed segments comprises at least five segments, with each segment of said series being less than 23 ms in length;
        said first module scans each segment of said at least five segments for a beacon signal in at least five successive beacon periods for said 802.11 class network; and
        said original activity is a continuous passive beacon spanning one notional beacon period for said 802.11-class network.

9. The communication device for communicating with a 802.11-class network and processing communications with a Bluetooth network as claimed in claim 8, wherein said first module repeats said scan for another channel associated with said 802.11-class network and further repeats said beacon scan periodically if no appropriate beacon signal is received.

10. The communication device for communicating with a 802.11-class network and processing communications with a Bluetooth network as claimed in claim 8, wherein said first module terminates said beacon scan when a connection carrying Advanced Audio Distribution Profile (A2DP) data is terminated.

11. The communication device for communicating with a 802.11-class network and processing communications with a Bluetooth network as claimed in claim 10, wherein said scan is replaced with an earlier scheme when a connection carrying said A2DP data is terminated.

12. The communication device for communicating with a 802.11-class network and processing communications with a Bluetooth network as claimed in claim 10, wherein said second module provides a termination signal to said first module when said transmission is terminated.

13. The communication device for communicating with a 802.11-class network and processing communications with a Bluetooth network as claimed in claim 8, wherein said first module further measures transmission characteristics of said beacon signal after it is received and analyzes said transmission characteristics to attempt to determine a source channel for said beacon signal.

14. The communication device for communicating with a 802.11-class network and processing communications with a Bluetooth network as claimed in claim 8, wherein said communication subsystem processes communications around the 2.4 GHz frequency band.

\* \* \* \* \*